US011442989B2

(12) United States Patent
Dvinov et al.

(10) Patent No.: US 11,442,989 B2
(45) Date of Patent: Sep. 13, 2022

(54) SCALABLE ROLL-UP SUMMARY FIELD CALCULATION USING GRAPHS

(71) Applicant: salesforce.com, inc., San Francisco, CA (US)

(72) Inventors: Danil Dvinov, Oakland, CA (US); Parth Vaishnav, Newark, CA (US)

(73) Assignee: Salesforce, Inc., San Francisco, CA (US)

( * ) Notice: Subject to any disclaimer, the term of this patent is extended or adjusted under 35 U.S.C. 154(b) by 188 days.

(21) Appl. No.: 16/741,248

(22) Filed: Jan. 13, 2020

(65) Prior Publication Data
US 2021/0216591 A1 Jul. 15, 2021

(51) Int. Cl.
G06F 16/23 (2019.01)
G06F 16/901 (2019.01)

(52) U.S. Cl.
CPC .......... *G06F 16/9024* (2019.01); *G06F 16/23* (2019.01)

(58) Field of Classification Search
CPC ... G06F 16/9027; G06F 16/9024; G06F 16/23
See application file for complete search history.

(56) References Cited

U.S. PATENT DOCUMENTS

| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

*Primary Examiner* — Robert W Beausoliel, Jr.
*Assistant Examiner* — Pedro J Santos
(74) *Attorney, Agent, or Firm* — Dergosits & Noah LLP; Todd A. Noah

(57) ABSTRACT

Systems and methods for updating values of roll-up summary fields (RSFs) associated with a data model are described. A server computing system receives data associated with roll-up summary fields (RSF) of objects of a data model. The data is in in a serialized format. The computer system deserializes the data to determine values of the RSFs at nodes of a graph associated with the data model. The computer system updates a value of a RSF at a first node of the graph. The computer system updates a value of one or more RSFs at one or more remaining nodes of the graph based on said updating the value of the RSF at the first node. The computer system serializes the values of the RSFs at all of the nodes of the graph to generate serialized data subsequent to said updating the value of the one or more RSFs at the one or more remaining nodes of the graph.

21 Claims, 13 Drawing Sheets

(56) References Cited

U.S. PATENT DOCUMENTS

| | | |
|---|---|---|
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,730,478 B2 | 6/2010 | Weissman |
| 7,779,039 B2 | 8/2010 | Weissman et al. |
| 7,779,475 B2 | 8/2010 | Jakobsen et al. |
| 7,814,124 B1 * | 10/2010 | de Jong ............... G06F 9/4493 707/798 |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Jakobsen |
| 2009/0177744 A1 | 7/2009 | Marlow et al. |
| 2011/0238705 A1 * | 9/2011 | Baker .................. G06F 16/289 707/802 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |

\* cited by examiner

SCALABLE ROLL-UP SUMMARY FIELD CALCULATION USING GRAPHS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to updating roll-up summary fields (RSFs) using graphs.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A roll-up summary field (RSF) calculates values from related records, such as those in a related list. A RSF can be created to display a value in a master record based on the values of fields in a detail record. The detail record may need to be related to the master through a master-detail relationship. For example, a RSF may be used to display the sum or total of invoice amounts for all related invoice custom object records in an account's invoices related list. The total may then be displayed in a custom account field called "Total Invoice Amount". Calculating RSFs in a large scale system with complex data model can be very time consuming depending on the number of records affected and other factors. This creates a lot of pressure on shared resources such as databases and computing resources. Some data models have multiple RSFs making the calculation more complex and can impact the performance of an organization.

BRIEF SUMMARY

For some embodiments, systems and methods for updating values of roll-up summary fields (RSFs) associated with a data model are described. A server computing system receives data associated with roll-up summary fields (RSF) of objects of a data model. The data is in in a serialized format. The computer system deserializes the data to determine values of the RSFs at nodes of a graph associated with the data model. The computer system updates a value of a RSF at a first node of the graph. The computer system updates a value of one or more RSFs at one or more remaining nodes of the graph based on said updating the value of the RSF at the first node. The computer system serializes the values of the RSFs at all of the nodes of the graph to generate serialized data subsequent to said updating the value of the one or more RSFs at the one or more remaining nodes of the graph. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
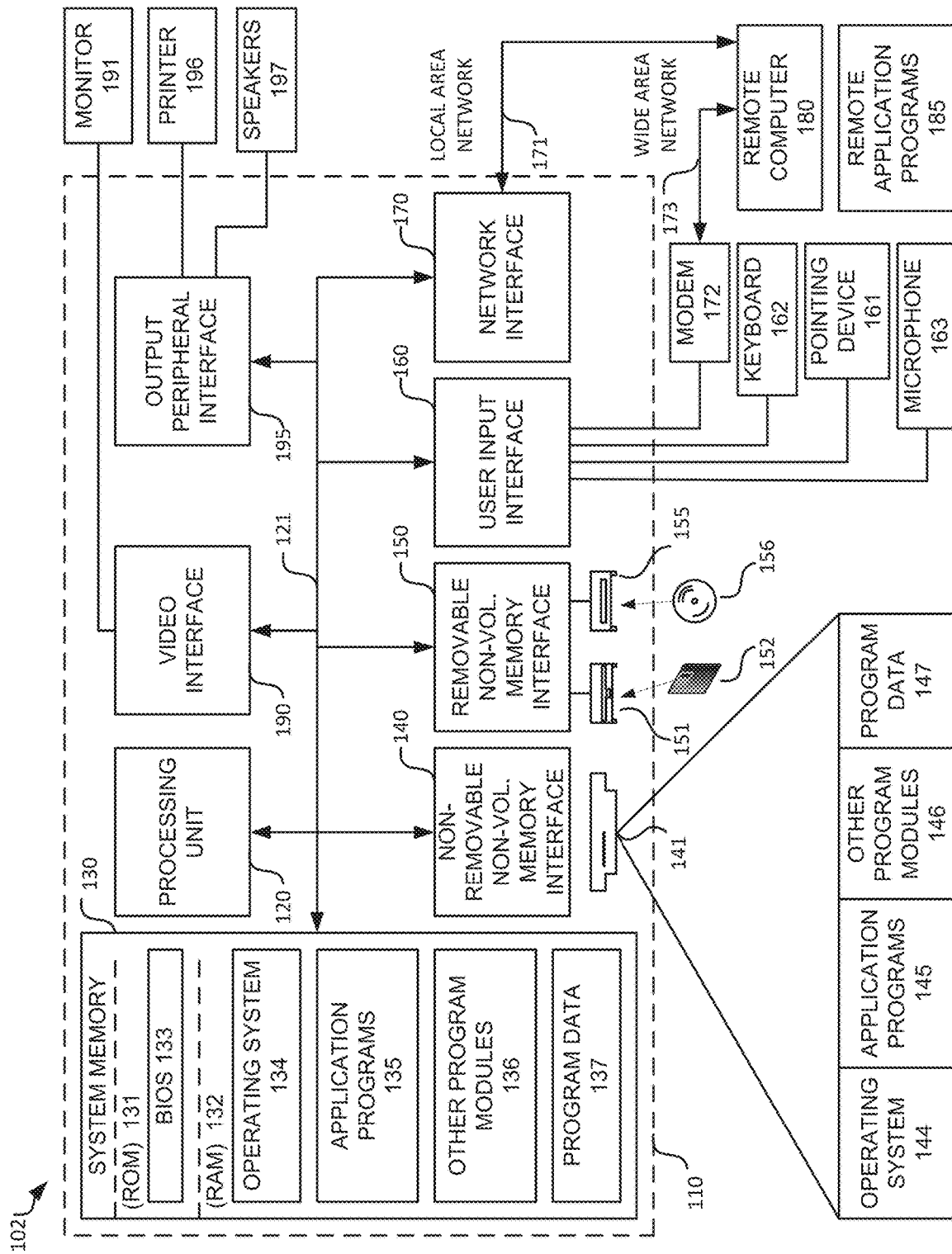
FIG. 1 shows a diagram of an example computing system that may be used with some embodiments.

Systems and methods for updating Roll-up Summary Fields (RSFs) using graphs may comprise receiving data associated with roll-up summary fields (RSF) of objects of a data model, deserializing the data to determine values of the RSFs, updating the values of the RSFs using the graph and based on established master detail relationships, and serializing the values of the RSFs.

The systems and methods associated with updating values of RSFs using graphs will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include a method for receiving, by a server computing system, data associated with roll-up summary fields (RSF) of objects of a data model, the data being in a serialized format; deserializing, by the server computing system, the data to determine values of the RSFs at nodes of a graph associated with the data model; updating, by the server computing system, a value of a RSF at a first node of the graph; updating, by the server computing system, a value of one or more RSFs at one or more remaining nodes of the graph based on said updating the value of the RSF at the first node; and serializing, by the server computing system, the values of the RSFs at all of the nodes of the graph to generate serialized data subsequent to said updating the value of the one or more RSFs at the one or more remaining nodes of the graph.

The disclosed embodiments may include a system for updating values of RSFs using graphs and may include one or more processors, and a non-transitory computer readable medium storing a plurality of instructions, which when executed, cause the one or more processors of a server computing system to receive data associated with roll-up summary fields (RSF) of objects of a data model, the data being in a serialized format; deserialize the data to determine values of the RSFs at nodes of a graph associated with the data model; update a value of a RSF at a first node of the graph; update a value of one or more RSFs at one or more remaining nodes of the graph based on said updating the value of the RSF at the first node; and serialize the values of the RSFs at all of the nodes of the graph to generate serialized data subsequent to said updating the value of the one or more RSFs at the one or more remaining nodes of the graph.

The disclosed embodiments may include a computer program product comprising computer-readable program code to be executed by one or more processors of a server computing system when retrieved from a non-transitory computer-readable medium, the program code including instructions to receive data associated with roll-up summary fields (RSF) of objects of a data model, the data being in a serialized format; deserialize the data to determine values of the RSFs at nodes of a graph associated with the data model; update a value of a RSF at a first node of the graph; update a value of one or more RSFs at one or more remaining nodes of the graph based on said updating the value of the RSF at the first node; and serialize the values of the RSFs at all of the nodes of the graph to generate serialized data subsequent to said updating the value of the one or more RSFs at the one or more remaining nodes of the graph.

While one or more implementations and techniques are described with reference to an embodiment relating to updating values of RSFs using graphs implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed. Further, some embodiments may include using Hardware Security Module (HSM), a physical computing device that safeguards and manages digital keys for strong authentication, including, for example, the keys used to encrypt secrets associated with the data elements stored in the data stores. It may be noted that the term "data store" may refer to source control systems, file storage, virtual file systems, non-relational databases (such as NoSQL), etc. For example, the migrated data may be stored in a source control system and then exposed through a virtual file system.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Some embodiments of the present invention may include methods and systems for updating values of RSFs. The methods and systems may enable using a graph of values of RSFs to update objects of a data model that utilizes master detail relationship between objects.

FIG. 1 is a diagram of an example computing system that may be used with some embodiments of the present invention. In diagram 102, computing system 110 may be used by a user to establish a connection with a server computing system. For example, the user may be associated with an application configured to update a data model that includes objects related by master detail relationships. The update to the data model may include update values of RSFs associated with the master detail relationships.

The computing system 110 is only one example of a suitable computing system, such as a mobile computing system, and is not intended to suggest any limitation as to the scope of use or functionality of the design. Neither should the computing system 110 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 110 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 110 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 110 typically includes a variety of computer program product. Computer program product can be any available media that can be accessed by computing system 110 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 110. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 110, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 110 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 110 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computing system 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 110 may be connected to the LAN 171 through a network interface or adapter 170. When used in a WAN networking environment, the computing system 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 110, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
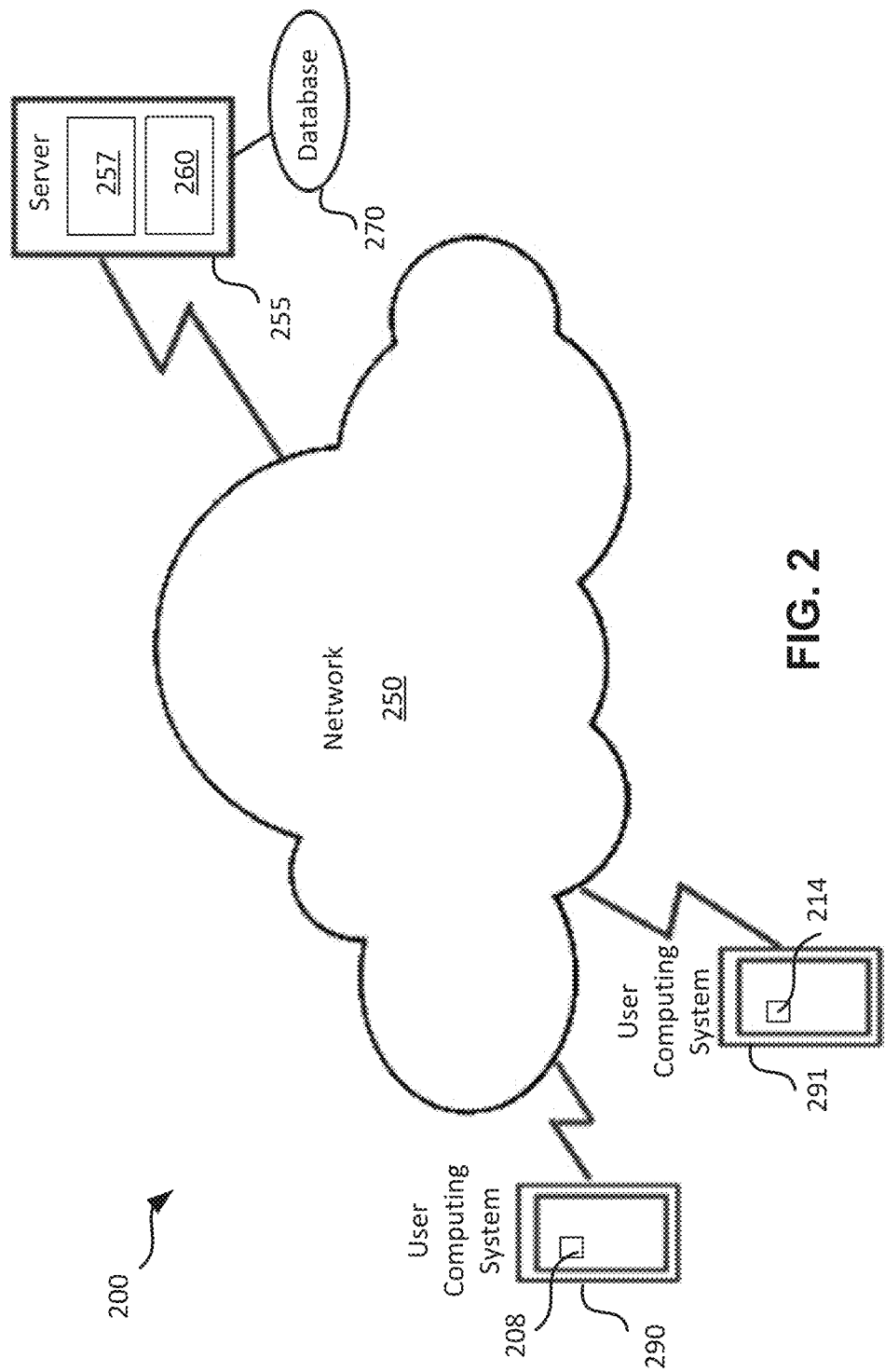
FIG. 2 shows a diagram of an example network environment that may be used with some embodiments.

FIG. 2 shows a diagram of an example network environment that may be used with some embodiments of the present invention. Diagram 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with server computing systems 255 via the network 250. The server computing system 255 may be coupled with database 270.

Each of the computing systems 290 and 291 may include an application module such as module 208 or 214. For example, a user may use the computing system 290 and the application module 208 to connect to and communicate with the server computing system 255 and log into application 257 (e.g., a Salesforce.com® application). For some embodiments, the server computing system 255 may be configured to run an update application 505 (shown in FIG. 5) to update values of RSFs associated with a data model which may include data stored in the database 270.

Figure 3A:
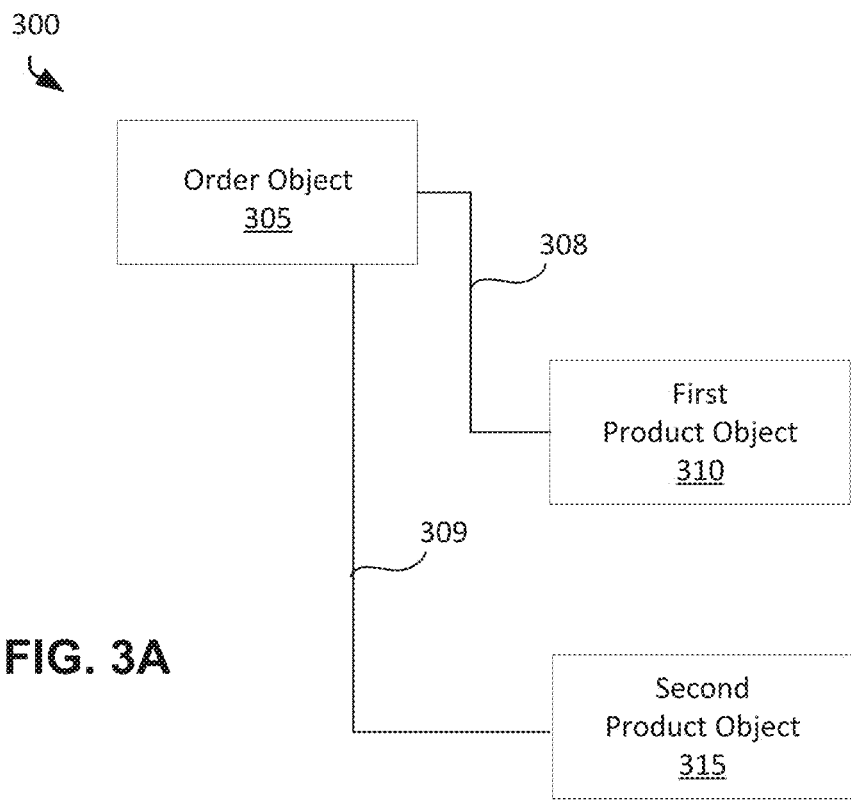
FIG. 3A shows an example diagram that includes related objects, in accordance with some embodiments.

FIG. 3A shows an example diagram that includes related objects, in accordance with some embodiments. Diagram 300 includes order object 305, first product object 310, and second product object 315. The lines 308 and 309 represent relationships between the order object 305 and each of the first product object 310 and second product object 315. Related objects may enable users to view records in one object and related records in another object. For some embodiments, two objects may be related to one another in a master-detail relationship. The master detail relationship may be similar to a parent-child relationship where the master is the parent and the detail is the child. For example, the order object 305 may be a master object, and the first product object 310 may be a detail object. As shown in this example, an order record in the order object 305 may include a first product (e.g., a t-shirt) and a second product (e.g., a hat).

In a master-detail relationship, a record in a detail object (also referred to as a detail record) may need to be related to a record in a master object (also referred to as a master record) and a master record may be related to one or more detail records. Deletion of a record in a master object may cause deletion of related records in the corresponding detail object. The master-detail relationship is a feature that is supported by the Salesforce Classic product of Salesforce.com of San Francisco, Calif. For example, using Salesforce Classic, a user can create a custom field on an object on the master side of the master detail relationship where the field is displayed.

Figure 3B:
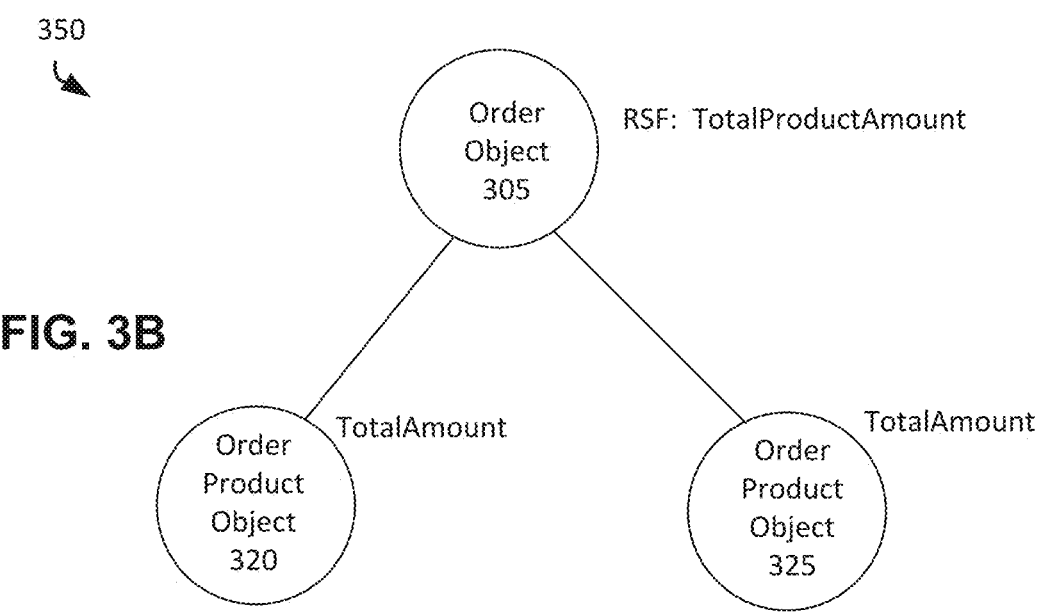
FIG. 3B shows an example diagram that includes related objects in a graph format, in accordance with some embodiments.

FIG. 3B shows an example diagram that includes related objects in a graph format, in accordance with some embodiments. For some embodiments, Roll-up Summary Fields (RSF) may be implemented based on a master-detail relationship between two objects. A RSF is a field in a master record that is configured to calculate values from related detail records in a master-detail relationship. Different types of calculations may be used with a RSF including, for example, counting a number of detail records that are related to a master record, summing values of a certain field, determining a minimum value of a set of values, or determining maximum value of a set of values. The field type of the RSF depends on the type of calculation. For example, number, currency, and percent fields may be the field type when the RSF is based on summing calculation, while number, currency, percent, date, and date/time may be the field type when the RSF is based on minimum or maximum calculation.

Diagram 350 includes a graph with multiple nodes with each node representing an object in a master detail relationship. In this example, the root of the graph is represented by a node associated with the order object 305. The order object 305 may include order records associated with an entity. The order object 305 is related to order product object 320 and order product object 325 in master detail relationships. Each of the order product objects 320 and 325 may include detail records that show a total amount of the product sold with a master record in the order object 305. Each detail record in the order product objects 320 and 325 may include a field "TotalAmount". Each master record in the order object 305 may include a field "TotalProductAmount" which may be a RSF. As a RSF, the value of the field "TotalProductAmount" may be configured to be based on a sum of the field "TotalAmount" of related detail records in the order product objects 320 and 325. For example, when an order includes one t-shirt (a first product) that costs $20 and one hat (a second product) that costs $15, then the field "TotalProductAmount" for an order record associated with that order may be calculated as $20+$15 or $35.

Figure 4A:
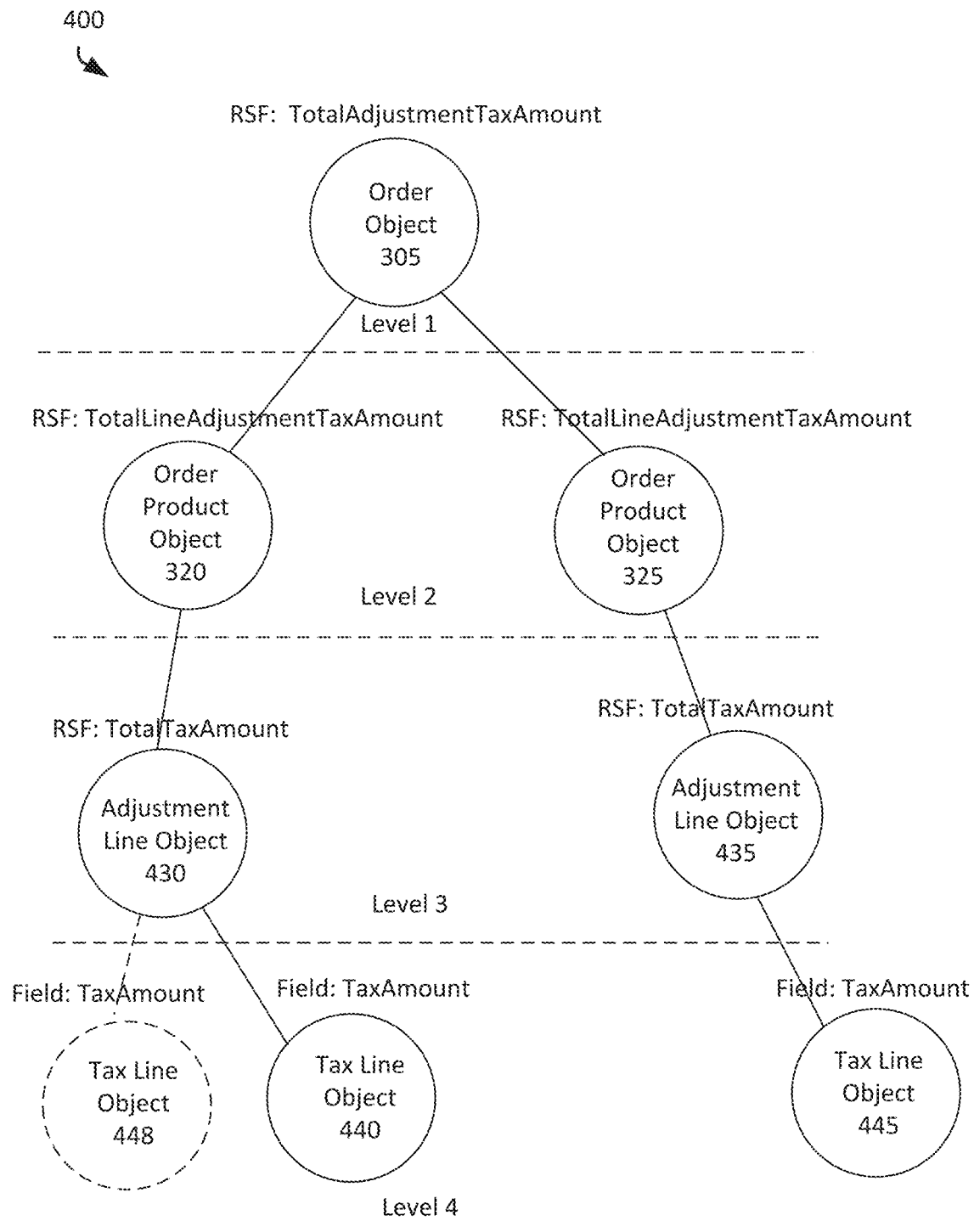
FIG. 4A shows an example diagram that includes a graph that includes multiple levels of master detail relationships, in accordance with some embodiments.

FIG. 4A shows an example diagram that includes a graph that includes multiple levels of master detail relationships, in accordance with some embodiments. In this example, the order product object 320 may be related to adjustment line object 430 in a master detail relationship, and the order product object 325 may be related to adjustment line object 435 in another master detail relationship. Similarly, the adjustment line object 430 may be related to the tax line object 440 in a master detail relationship, and the adjustment line object 435 may be related to the tax line object 445 in another master detail relationship.

The graph in diagram 400 may include multiple RSFs in different master objects. For example, the order object 305 may include a RSF field "TotalAdjustmentTaxAmount" which may be configured to be based on a sum of the field "TotalLineAdjustmentTaxAmount" of the order product objects 320 and 325. The value of the RSF field "TotalLineAdjustmentTaxAmount" of the order product object 320 may be configured to be based on a sum of the field "TotalTaxAmount" of each related detail records in the adjustment line object 430. The field "TotalTaxAmount" of the adjustment line object 430 may be configured as a RSF, and its value may be based on a value of the field "TaxAmount" of a related detail record in the tax line object 440. In this example, the tax line object 440 may not include a RSF because it is not in a master detail relationship where it is a master object.

When a data model (such as the data model shown in FIG. 4A) includes multiple master detail relationships and multiple RSFs, a change to the data model may cause many recalculations to be performed. For example, the tax line object 440 may represent a county tax. When a new tax line object 448 (shown in hyphenated lines) is added to represent a city tax, it may be necessary to load the adjustment line object 430 and perform the calculation to update the RSF associated with the adjustment line object 430 to reflect the county tax and the city tax. The update of the RSF associated with the adjustment line object 430 may require loading the order product object 320 and perform the calculation to update the RSF associated with the order product object 320. The update of the RSF associated with the order product object 320 may require loading the order object 305 and perform the calculation to update the RSF associated with the order object 305. For each of these calculations, a server system may need to load a master object (e.g., adjustment line object 330) from the database and lock it to prevent concurrent modifications. The loading of an object may cause an increase in both execution time as well as database processing time, which is a shared resource across all tenants in a multi-tenant system. When there are tens of thousands of orders, the need to perform recalculations for all the RSFs can add significant load on the system.

Figure 4B:
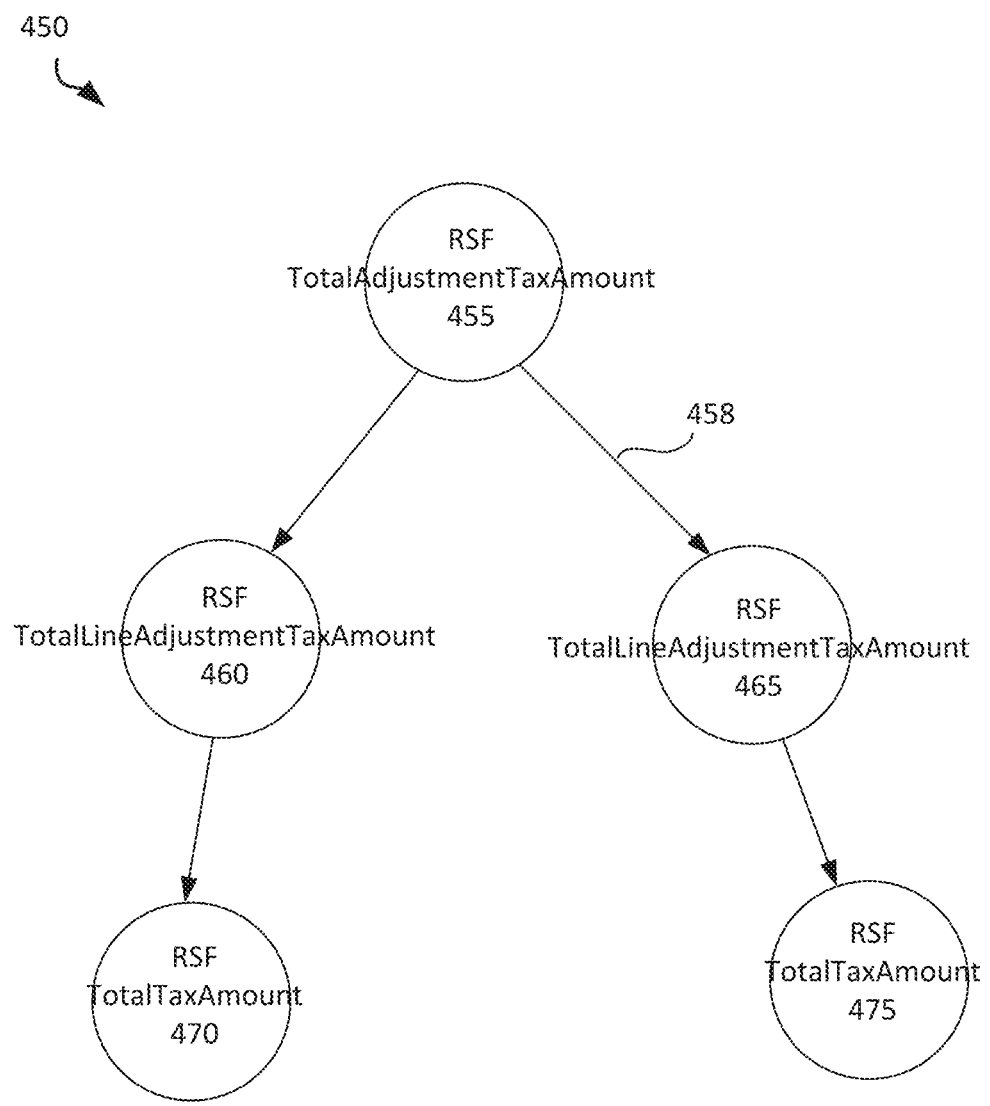
FIG. 4B shows an example diagram that includes a directed graph that may be used to represent multiple RSFs in a data model, in accordance with some embodiments.

FIG. 4B shows an example diagram that includes a directed graph that may be used to represent multiple RSFs in a data model, in accordance with some embodiments. The graph shown in diagram 450 includes nodes or vertices connected by directional edges between two nodes. For some embodiments, a graph may be used to represent all the RSFs in a data model. The nodes of the graph shown in diagram 450 may correspond to the RSFs in the first three levels of the graph in diagram 400. Each node of the diagram 450 may represent a value of a RSF of a corresponding object shown in FIG. 4A.

For some embodiments, a graph field may be included in the object located at the root node of the data model. For example, a graph field may be included in the order object 305 in diagram 400. As such, each order record in the order object 305 may include a graph field to represent all of the values of the RSFs associated with that order record. For some embodiments, the data contained in a graph field may be stored in a serialized format and is represented by a directed graph. Serialization may enable storing the graph as binary data that may be stored and transmitted. Deserialization may be performed to generate the graph structure from the serialized data. For example, the graph may be represented using a data structure that includes an array for the vertices. A directed edge between two nodes may be represented as a pair of values in an order where a first value represents the "from" node and a second value represents the "to" node. For example, for a graph with four vertices v1, v2, v3 and v4, where there is a directed edge between v1 and v2, between v2 and v3, and between v1 and v4 may be represented as ([v1, v2, v3, v4], [{v1, v2}, {v2, v3}, {v1, v4}]). From FIG. 4B, the pair of values (455, 465) may be used to represent the nodes connected by the edge 458. An array for the vertices may be used to represent the edges. For example, the five nodes: 455, 460, 465, 470, and 475 may be arranged in an array that may include five rows and five columns where a value of "1" may be used to indicate an edge exists between two nodes and a "0" may be used to indicate no edge exists between two nodes. As another example, the graph may be represented using JGraphT, a Java library of graph theory data structures and algorithms of an open source software named JGraph.

Figure 4C:
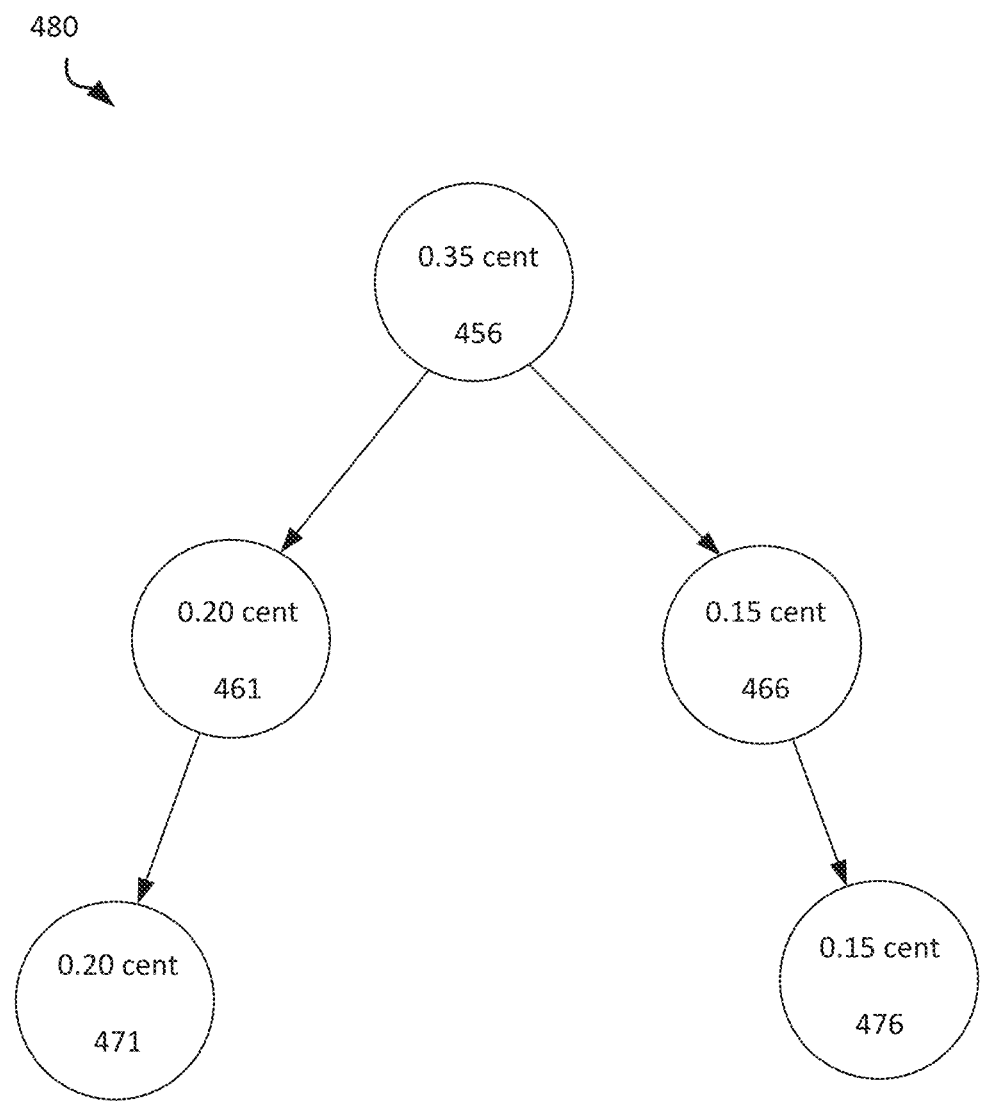
FIG. 4C shows an example diagram that includes a directed graph with RSF values, in accordance with some embodiments.

FIG. 4C shows an example diagram that includes a directed graph with RSF values, in accordance with some embodiments. The nodes in diagram 480 may correspond to the nodes in diagram 450 with each node in the diagram 480 showing a value for the RSF of the corresponding node in diagram 450. The values of the RSFs may represent tax amounts. For example, there may be an order that has two products, a t-shirt and a hat. The t-shirt is associated with the order product object 320, while the hat is associated with the order product object 325 (shown in FIG. 4A). The total tax amount to be paid for the t-shirt is 0.20 cent, and the total tax amount to be paid for the hat is 0.15 cent. In diagram 480, from top to bottom and from left to right at each level, the nodes may be listed in the following order: 456, 461, 466, 471 and 476. The RSF values may be represented by field names as follows:

{Order.TotalAdjustmentTaxAmount,
OrderProduct1.TotalLineAdjustmentTaxAmount
OrderProduct2.TotalLineAdjustmentTaxAmount
AdjustmentLine1.TotalTaxAmount
AdjustmentLine2.TotalTaxAmount}, or represented by values as follows:

{0.35, 0.20, 0.15, 0.20, 0.15}.

Using the graph field associated with order object 305, it may be possible to quickly access the values of all the RSFs associated with a record of the order object 305. For example, an application may be configured to access the graph field of a record, deserialize the data included in the graph field to create a graph, determine a node in the graph where update needs to be made, and perform any necessary calculation to the RSFs affected by the update.

A database administrator may need create the tax line object 448 (shown in hyphenated lines in FIG. 4A) and update the data model to add the tax line object 448. Tax line records may be added to the tax line object 448. The database administrator may also need to establish a master detail relationship between the adjustment line object 430 and the tax line object 448. Further, the database administrator may need to update the RSF field "TotalTaxAmount" of the adjustment line object 430 to indicate that its value is based on a sum of the two "TaxAmount" fields of the tax line objects 440 and 448. Operations performed by the database administrator may be via an interface with a server computing system associated with the order object 305.

Figure 5:
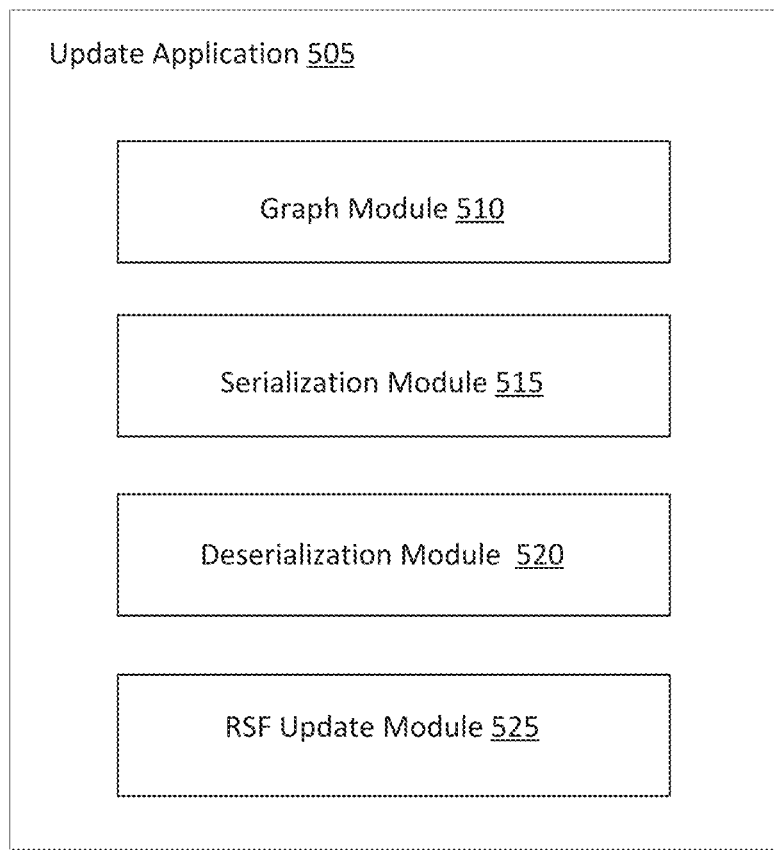
FIG. 5 shows an example block diagram that includes an update application, in accordance with some embodiments.

FIG. 5 shows an example block diagram that includes an update application, in accordance with some embodiments. Update application 505 may include graph module 510, serialization module 515, deserialization module 520, and RSF update module 525. As shown in FIG. 4A, adding the tax line object 448 to the data model may require the RSFs in the data model to be updated. Typically, this may require loading multiple objects and performing multiple calculations. For some embodiments, the graph module 510 may be configured to determine the values of the RSFs in a data model using a graph structure that is based on the data model. The serialization module 515 may be configured to serialize the values of the RSFs and store the result in the graph field. The deserialization module 520 may be configured to deserialize the data stored in the graph field to generate a graph. The RSF update module 525 may be configured to perform updates on the RSFs in the graph when there is an update to the data model, or when there is an update to a value of a RSF. Together, the modules 510-525 may perform the operations for the update application 505.

In the examples shown in FIGS. 4A-4C, the order records are updated to reflect a change to the data model when the tax line object 448 is added. The update application 505 may be configured to be aware that the tax line object 448 is related to the adjustment line object 430 based on established master detail relationship. As such, the update application 505 may be aware of the node(s) in the graph that needs to be updated. After the data included in a graph field of an order record is deserialized, the update application 505 may traverse down the graph from the root node to find the affected node using the established master detail relationships. For example, the update application 505 may traverse a graph such as the graph shown in FIG. 4B from the root node 455 to the node 470 and update value of the RSF "TotalTaxAmount", which corresponds to the adjustment line object 430. The update application 505 may the traverse up the graph to find a next RSF that needs to be updated. For example, the update application 505 may update the value of the RSFs at nodes 460 and 455. The traversing of the graph may be based on the graph being a directed graph.

It may be possible to have an RSF in a data model not be updated by the update application 505 even when there is an update to another RSF in the data model. For example, the update to the RSF "TotalTaxAmount" at node 470 may not cause the RSF "TotalLineAdjustmentTaxAmount" at node 465 to be updated.

Figure 6:
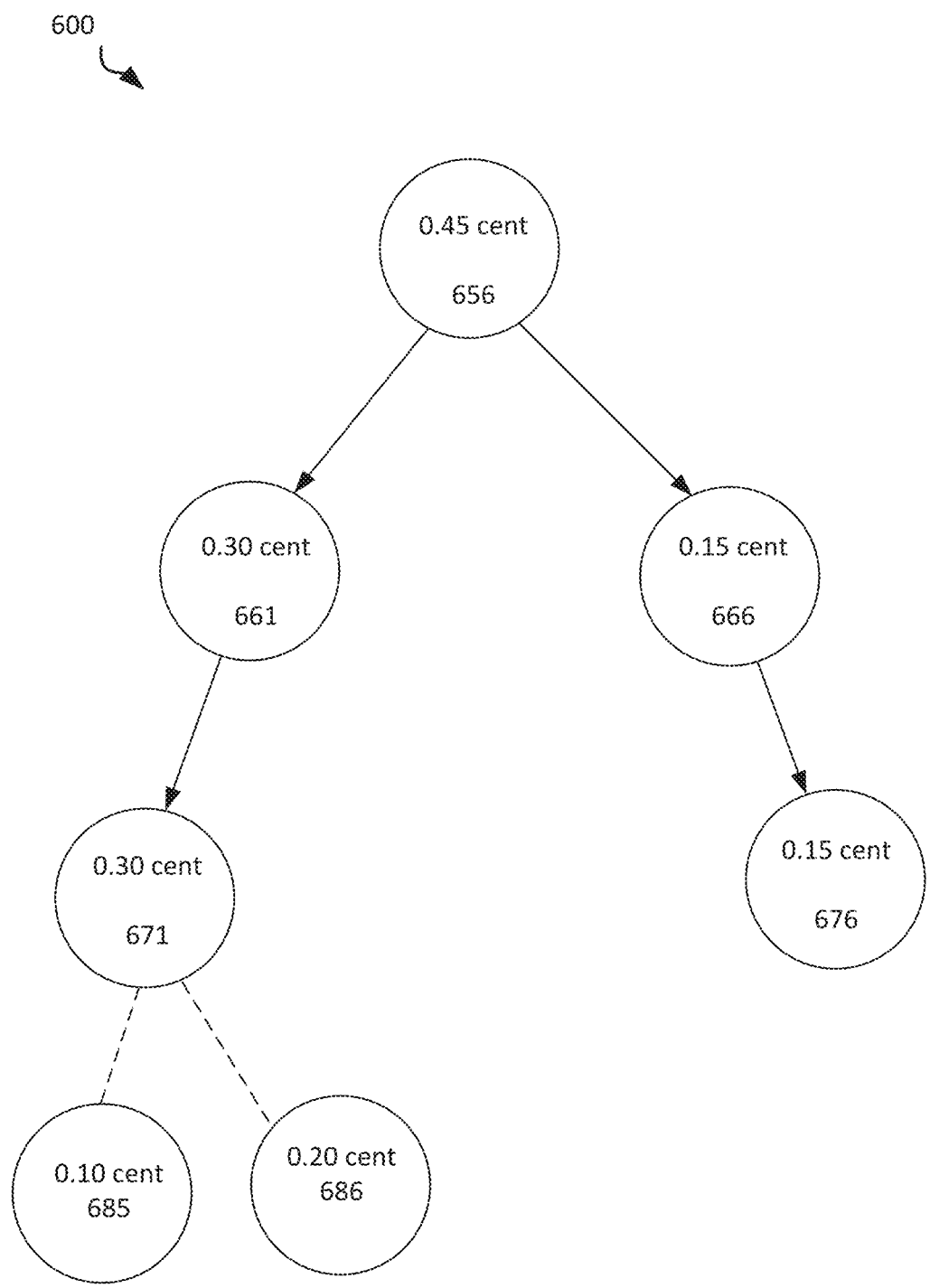
FIG. 6 shows an example diagram that includes a directed graph with updated RSF values, in accordance with some embodiments.

FIG. 6 shows an example diagram that includes a directed graph with updated RSF values, in accordance with some embodiments. The nodes 656, 661, 666, 671 and 676 in diagram 600 may correspond to the nodes 456, 461, 466, 471 and 476 in diagram 480 with some nodes in the diagram 600 having updated values. The nodes 685 and 686 are not part of the graph but are included to show the values used to calculate the value at the node 671. The values of 0.10 cent and 0.20 cent at nodes 685 and 686 represent the tax amounts from the tax line objects 448 and 450 (shown in FIG. 4A). The value 0.30 cent at node 671 represents an updated RSF value caused by the addition of the 0.10 cent at node 685 to the 0.20 cent at node 686. The value 0.30 cent at node 661 represents an updated RSF value caused by the update to the node 671. The value 0.45 cent at node 656 represents an updated RSF value caused by the update to the node 661. After the update application 505 completes the update operations, the RSF values associated with an order record may be represented as follows: {0.45, 0.30, 0.15, 0.30, 0.15}. It may be noted that the above description refers to an update to a data model such as adding a new object (e.g., tax line object 448) to the data model, the technique described may also be applicable when there is a change to a value of a RSF in the data model.

Figure 7A:
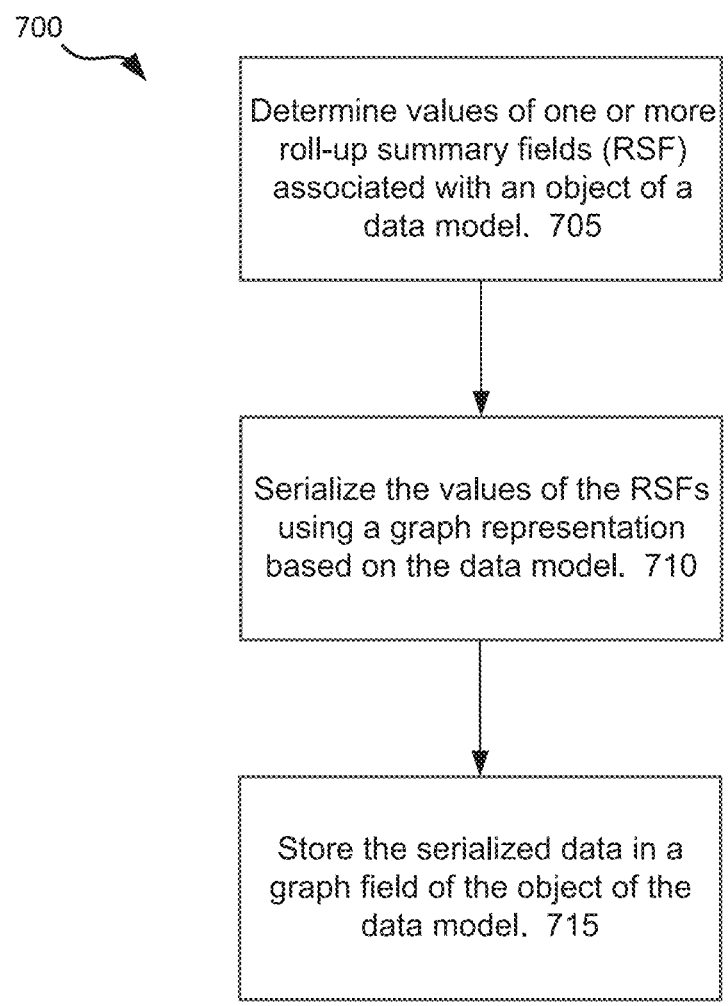
FIG. 7A is an example flow diagram of a process that may be used to serialize values of RSFs, in accordance with some embodiments.

FIG. 7A is an example flow diagram of a process that may be used to serialize values of RSFs, in accordance with some embodiments. The process shown in diagram 700 may be associated with a data model with multiple RSFs such as, for example, the data model described with FIGS. 4A-4C. The process may be performed by an update application 505 described with FIG. 5.

At block 705, the update application 505 may determine the values of the RSFs associated with an object of a data model. The RSFs may be associated with the objects included in the data model. The objects may be related with one another based on master detail relationships such as, for example, the master detail relationship described with FIG. 4A. At block 710, the values of the RSFs may be serialized using a graph representation that is based on the data model. For example, the graph in FIG. 4B is a graph representation of the values of the RSFs shown in FIG. 4A. At block 715, the serialized data may be stored in a graph field of the object.

Figure 7B:
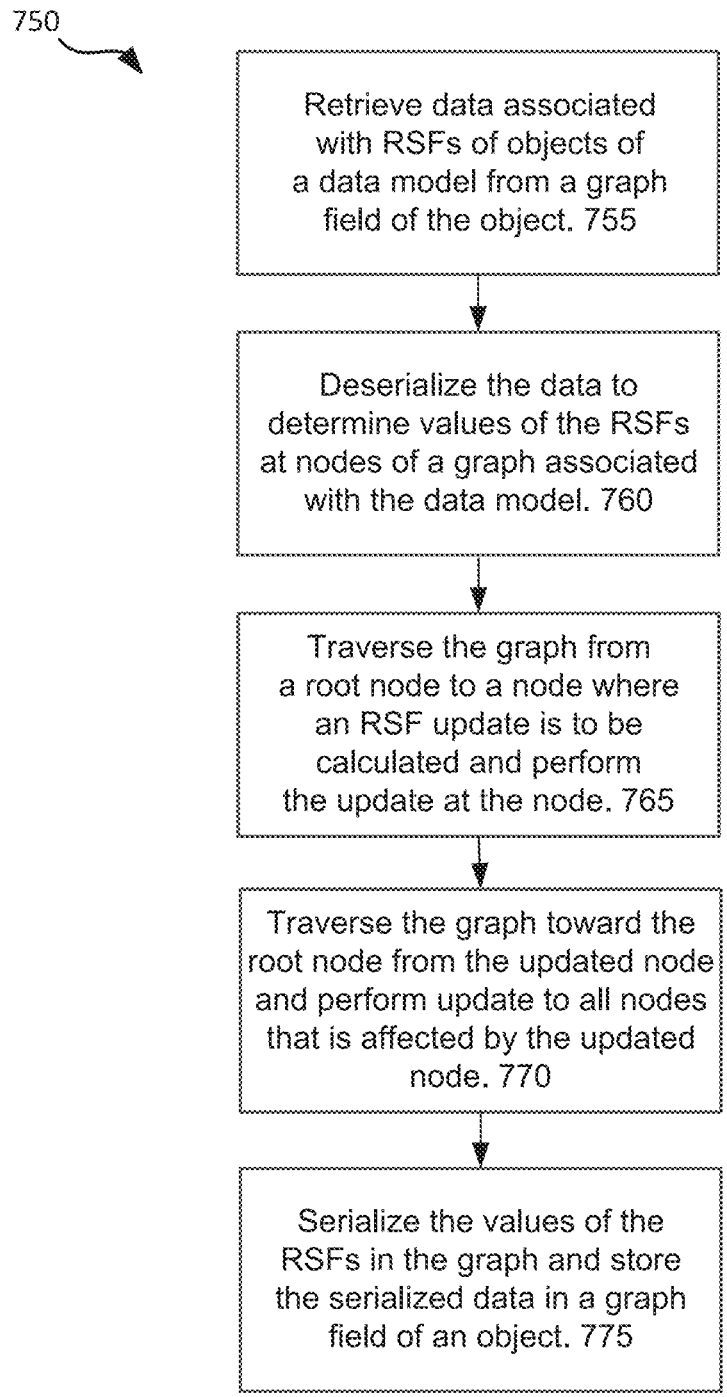
FIG. 7B is an example flow diagram of a process that may be used to update RSFs of an object in a data model using graph representation, in accordance with some embodiments.

FIG. 7B is an example flow diagram of a process that may be used to update RSFs of an object in a data model using graph representation, in accordance with some embodiments. The process shown in diagram 750 may be performed by the update application 505 described with FIG. 5 to update multiple RSFs such as, for example, the RFSs described with FIGS. 4A-4C.

At block 755, the update application 505 may retrieve data associated with RSFs of objects associated with a data model. The data may have previously been stored in a graph field of an object in a serialized format. At block 760, deserialization operations may be performed on the data to determine the values of the RSFs at nodes of a graph associated with the data model. At block 765, the update application may traverse down the graph from a root node to a node where an RSF update is to be calculated. The value of the RSF at the node may then be updated. The traversing of the graph may be based on established master detail relationships between objects of the data model. At block 770, the update application 505 may traverse up the graph toward the root node and perform any necessary updates of the RSFs at nodes that are affected by the updated RSF. When the graph includes multiple levels, the updating may involve the RSFs at different levels of the graph up to and including the root node. At block 775, the values of the RSFs in the graph may be serialized and stored in a graph field of the object.

Figure 8A:
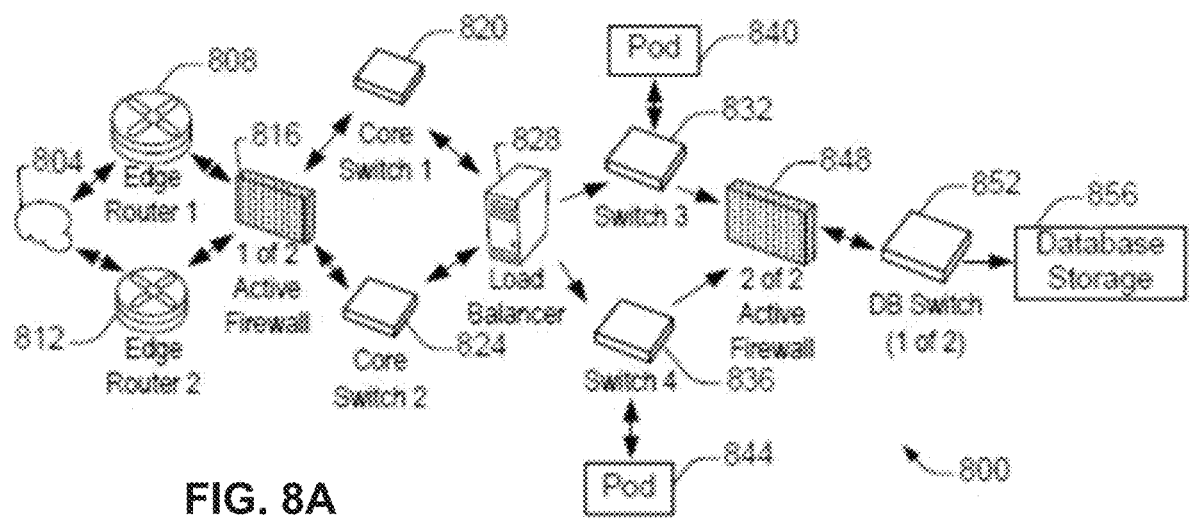
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand Services. Communication with the pods may be conducted via pod switches 832 and 836. Components of the on-demand service environment may communicate with a database storage system 856 via a database firewall 848 and a database switch 852.

Figure 8B:
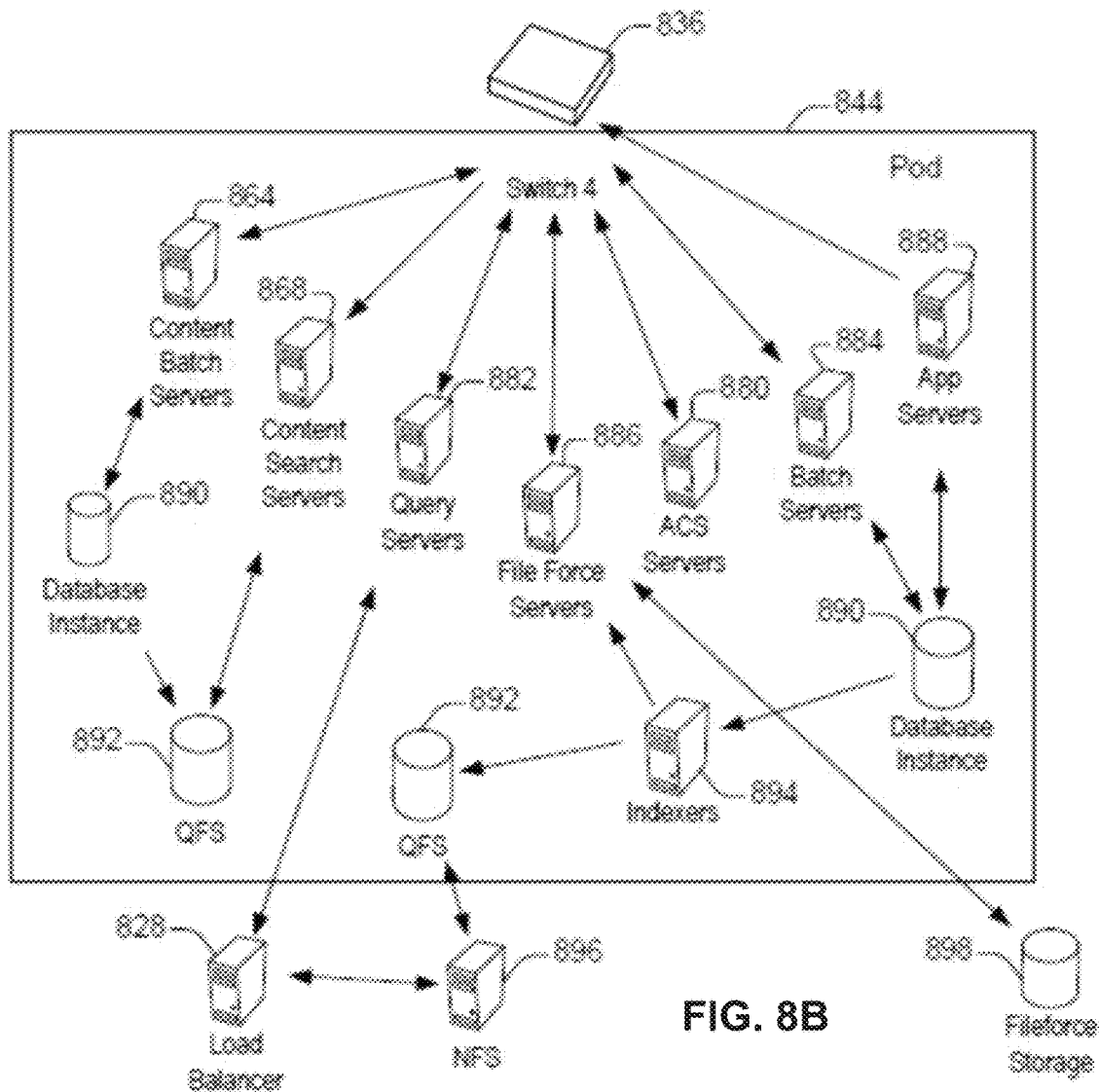
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 882, Fileforce servers 886, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may request internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 886 may manage requests information stored in the Fileforce storage 898. The Fileforce storage 898 may store information such as documents, images, and basic large objects (BLOBs). By managing requests for information using the Fileforce servers 886, the image footprint on the database may be reduced.

The query servers 882 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 882 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 882 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to Fileforce servers 886 and/or the QFS 892.

Figure 9:
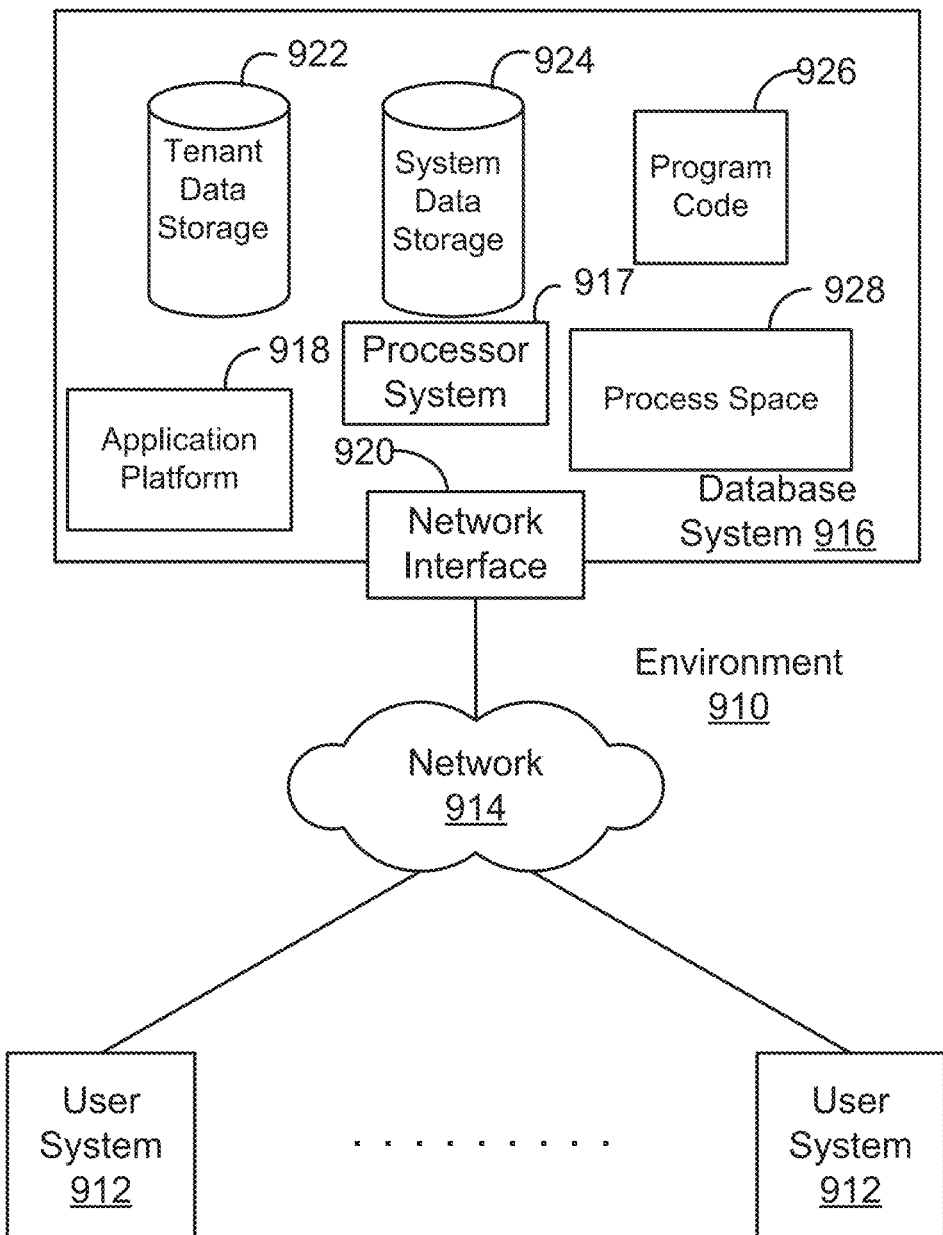
FIG. 9 shows a system diagram illustrating the architecture of a multi-tenant database environment, in accordance with some embodiments.
Figure 10:
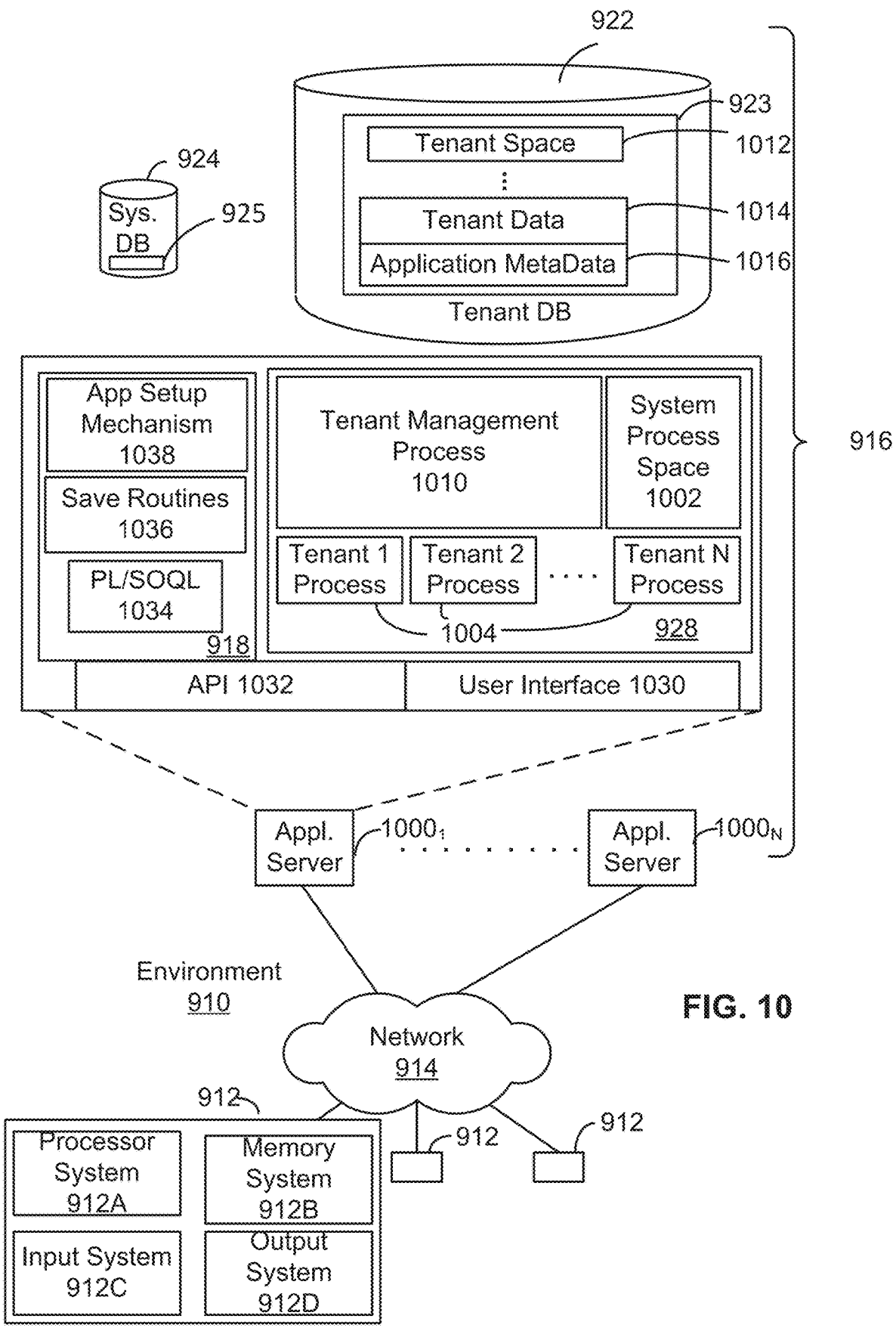
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N−1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method for updating values of roll-up summary fields (RSFs) associated with a data model comprising:
   receiving, by a server computing system, data associated with RSFs of objects of a data model, the data being stored in a serialized format in graph fields of the objects;
   deserializing, by the server computing system in response to receiving an updated value associated with a RSF of an object of the data model, the data in the graph field of the object to determine values of the RSFs at nodes of a graph that represent the objects of the data model;
   updating, by the server computing system, a value of a RSF at a first node of the graph based on the updated value;
   updating, by the server computing system, a value of one or more RSFs at one or more remaining nodes of the graph by traversing the graph, based on said updating the value of the RSF at the first node; and
   serializing, by the server computing system, the values of the RSFs at all of the nodes of the graph to generate serialized data subsequent to said updating the value of the one or more RSFs at the one or more remaining nodes of the graph.

2. The method of claim 1, wherein said updating the value of one or more RSFs at the one or more remaining nodes of the graph is performed based on one or more established master detail relationships.

3. The method of claim 2, wherein the graph is a directed graph.

4. The method of claim 3, wherein the data model includes an object associated with a root node of the graph.

5. The method of claim 4, further comprising storing the serialized data in the graph field.

6. The method of claim 5, wherein said updating the value of the one or more RSFs at the one or more remaining nodes of the graph is performed by traversing the graph from the root node and by using the one or more established master detail relationships.

7. The method of claim 6, wherein said updating of the value of the RSF at the first node of the graph is based on an update to the data model.

8. A system for updating values of roll-up summary fields (RSFs) associated with a data model comprising
   one or more processors; and
   a non-transitory computer readable medium storing a plurality of instructions, which
   when executed, cause the one or more processors of a server computing system to:
   receive data associated with RSFs of objects of a data model, the data being stored in a serialized format in graph fields of the objects configured to store the data associated with the RSFs of the objects of the data model;
   deserialize, in response to receiving an updated value associated with an RSF of an object of the data model, the data in the graph field of the object to determine values of the RSFs at nodes of a graph that represent the objects of the data model;
   update a value of an RSF at a first node of the graph based on the updated value;
   update a value of one or more RSFs at one or more remaining nodes of the graph by traversing the graph, based on said updating the value of the RSF at the first node; and
   serialize the values of the RSFs at all of the nodes of the graph to generate serialized data subsequent to said updating the value of the one or more RSFs at the one or more remaining nodes of the graph.

9. The system of claim 8, wherein said instructions to update the value of one or more RSFs at the one or more remaining nodes of the graph are performed based on one or more established master detail relationships.

10. The system of claim 9, wherein the graph is a directed graph.

11. The system of claim 10, wherein the data model includes an object associated with a root node of the graph.

12. The system of claim 11, further comprising instructions to store the serialized data in the graph field.

13. The system of claim 12, wherein said instructions to update the value of the one or more RSFs at the one or more remaining nodes of the graph are performed by traversing the graph from the root node and by using the one or more established master detail relationships.

14. The system of claim 13, wherein said instructions to update of the value of the RSF at the first node of the graph are based on an update to the data model.

15. A computer program product for updating values of roll-up summary fields (RSFs) associated with a data model comprising a non-transitory computer-readable medium having computer readable program code embodied therein to be executed by one or more processors, the program code including instructions to:
   receive data associated with RSFs of objects of a data model, the data being in a serialized format in graph fields of the objects;
   deserialize, in response to receiving an updated value associated with an RSF of an object of the data model, the data in the graph field of the object to determine values of the RSFs at nodes of a graph that represent the objects of the data model;
   update a value of a RSF at a first node of the graph based on the updated value;

update a value of one or more RSFs at one or more remaining nodes of the graph by traversing the graph, based on said updating the value of the RSF at the first node; and serialize the values of the RSFs at all of the nodes of the graph to generate serialized data subsequent to said updating the value of the one or more RSFs at the one or more remaining nodes of the graph.

16. The computer program product of claim 15, wherein said instructions to update the value of one or more RSFs at the one or more remaining nodes of the graph are performed based on one or more established master detail relationships.

17. The computer program product of claim 16, wherein the graph is a directed graph.

18. The computer program product of claim 17, wherein the data model includes an object associated with a root node of the graph.

19. The computer program product of claim 18, further comprising instructions to store the serialized data in the graph field.

20. The computer program product of claim 19, wherein said instructions to update the value of the one or more RSFs at the one or more remaining nodes of the graph are performed by traversing the graph from the root node and by using the one or more established master detail relationships.

21. The computer program product of claim 20, wherein said instructions to update of the value of the RSF at the first node of the graph are based on an update to the data model.

\* \* \* \* \*